Oct. 27, 1936.   J. B. HADAWAY   2,058,443
ART OF MAKING SHOES
Filed July 25, 1934
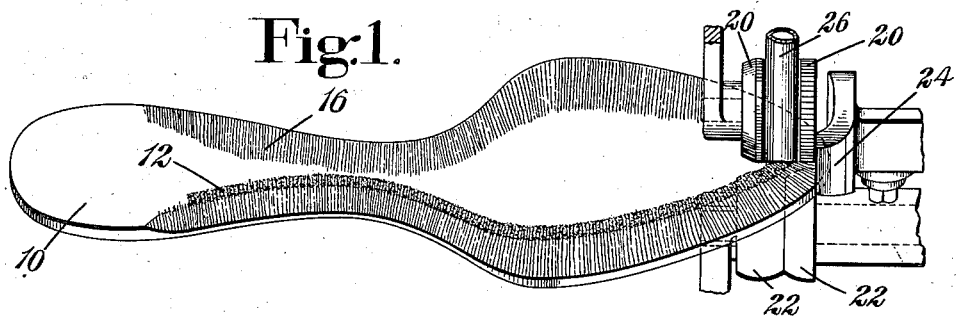
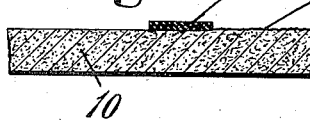
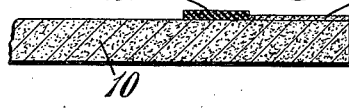
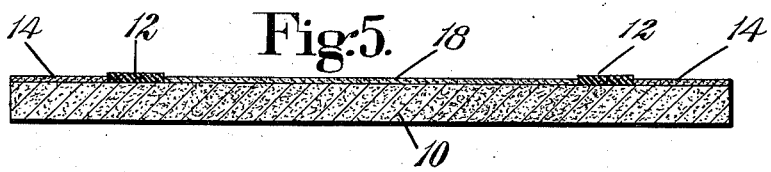
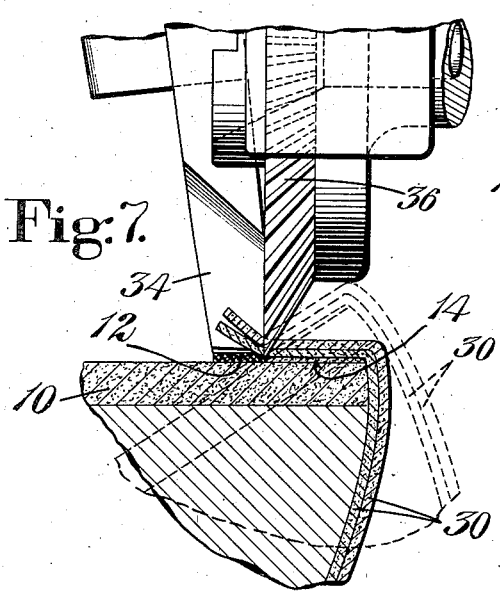
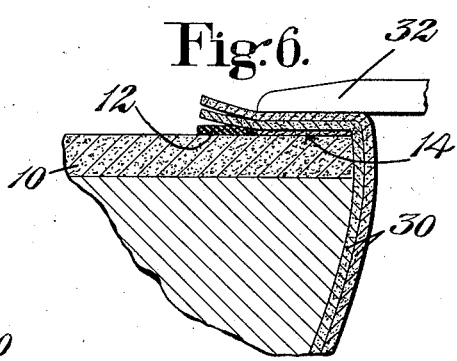
INVENTOR
John B. Hadaway
By his Attorney,
Harbow M. Davis Patented Oct. 27, 1936

2,058,443

UNITED STATES PATENT OFFICE 2,058,443

ART OF MAKING SHOES

John B. Hadaway, Swampscott, Mass., assignor to United Shoe Machinery Corporation, Paterson, N. J., a corporation of New Jersey Application July 25, 1934, Serial No. 736,812

15 Claims. (Cl. 12—142)

This invention relates to improvements in the art of making shoes and to improvements in insoles as articles of manufacture.

In the manufacture of shoes it is desirable that the various operations involved shall be performed with substantial uniformity upon the different shoes in order that the shoes when finished shall be as nearly uniform as possible in construction and appearance. If the shoes are to have their outsoles attached by means of cement it is desirable, for example, that the upper materials of the shoes, after having been lasted, shall be trimmed to provide overlasted margins of substantially the same shape and size to receive the sole-attaching cement. Moreover, whether the outsoles are to be attached by cement or otherwise, it is desirable that space within the trimmed edges of the overlasted upper margins of the different shoes of the same size shall be uniform in size and shape, particularly if this space is to be filled with sheet filler the pieces of which must be cut to a predetermined contour before being applied. In lasting shoe uppers with cement it frequently happens that the cemented area extends inwardly in some places too far from the sole edge and consequently the upper becomes stuck to the insole in those localities and as a result the subsequent operation of trimming off the surplus upper materials is interfered with and the insole is likely to be damaged by the trimming cutters.

In view of the foregoing, one object of the present invention is to facilitate attainment of uniformity in cement lasting and in subsequent upper trimming operations.

To the accomplishment of this object the invention provides an improvement in the art of making shoes having cement-lasted uppers characterized by applying to a surface of an insole, inside a marginal portion thereof to which it is desired to secure an upper, a coating or stripe of material to which cement will not adhere (for example, wax or paraffin, if rubber cement or latex is employed as the lasting cement, or a solution of rubber, such as latex, if pyroxylin cement is employed in lasting, such materials being referred to hereinafter as materials repellent to cement) and thereafter cement-lasting an upper over the insole while utilizing the coating of repellent material to limit the width of the cement bond between the overlasted upper margin and the insole. With an insole thus prepared, if any of the cement which is employed to secure the overlasted margin of the upper to the insole outside the area covered by the repellent material becomes squeezed or displaced inwardly over the surface of the latter during the lasting operation this displaced cement will not stick the upper material to the insole because of the presence of the repellent material between the displaced cement and the insole. Consequently, after the cement has hardened, it becomes an easy matter to raise the surplus upper material which extends inwardly beyond the outer edge of the coating of repellent material and to trim this surplus upper material along the line of that edge without danger of cutting the insole or mutilating the upper materials by ragged or uneven trimming of the latter and such gaging of the trimming cut in the operation of trimming the overlasted upper materials constitutes an important part of my improved method of making shoes.

It is to be recognized that invention resides also in an improved article of manufacture comprising a sole, for example, an insole, having upon its attaching surface a stripe of cement for attaching the sole to a shoe and a coating or stripe of material to which the attaching cement will not adhere, said coating being spaced inwardly from the stripe of cement.

The invention will be explained with reference to the accompanying drawing, in which Fig. 1 is a perspective view of an insole and the operating members of an extruding machine illustrating the operation of applying to the insole a stripe of material which is repellent to cement;

Fig. 2 is a top plan view of an insole having a stripe of repellent material applied thereto;

Fig. 3 is a fragmentary sectional view taken along the line III—III of Fig. 2;

Fig. 4 is a view similar to Fig. 3 but showing the insole as it appears after a stripe of cement has been applied to the portion of the sole margin outside of the stripe of repellent material;

Fig. 5 is a cross-sectional view through the forepart of an insole having a stripe of repellent material thereon and having the surface of the insole coated with cement both inside and outside of the stripe of repellent material;

Fig. 6 is a sectional view through the toe portion of a shoe illustrating the lasting of the upper materials over an insole which has been prepared in accordance with the present invention; and Fig. 7 is a sectional view through the forepart of a lasted shoe illustrating the step of trimming the overlasted margin of the upper.

In the drawing, 10 designates an insole which is to be attached to the upper of a shoe by means of cement and 12 indicates a stripe of material which is repellent to the attaching cement. The stripe 12 of repellent material is shown as having been applied to the side of the insole to which the upper materials are to be secured in the lasting operation and as extending along the marginal portions of the shank and forepart of the insole. The stripe 12 extends in substantially parallel relation to the sole edge and may be spaced inwardly a uniform distance from the sole edge throughout its length to allow for the application of a coating of cement between the stripe 12 and the edge of the sole. As illustrated, however, it may be found desirable to apply the stripe 12 of repellent material somewhat farther inwardly from the sole edge about the forepart than along the shank portion of the insole. This provides for a wider area of cement attachment between the stripe 12 and the sole edge at the forepart of the sole (where the sole is subjected to a substantial amount of flexing or bending in the use of the shoe and consequently where a somewhat more secure attachment of the insole to the upper is desirable) than in the shank portion where the insole of the shoe is comparatively rigid.

The cement employed for lasting the upper may be applied to the margin of the insole, outside the area covered by the repellent material as indicated at 14 in Fig. 4, or to the lasting allowance of the upper, or to both the insole and the upper. If the cement is to be applied to the insole, however, it is preferable to apply it after the stripe of repellent material has been applied, since the latter will then function to check any tendency of the cement to spread or flow inwardly and will thus serve definitely to confine the stripe or coating of cement to an area of the desired width. The repellent material will thus limit the inward spread or flow of the cement partly because of its repellent action and partly because it has a substantial thickness so that it actually serves as a barrier beyond which there is little if any tendency for the cement to spread.

Any suitable cement may be employed for securing the upper in overlasted relation to the insole, for example, pyroxylin cement and the water-dispersed rubber cement commonly known as latex. I have found that wax, for example paraffin, constitutes a suitable repellent for rubber cement or latex and that either is well adapted, when liquefied by heat or otherwise, for application to an insole to constitute the stripe 12 of repellent material. In cases where pyroxylin cement is used as the means for securing the upper to the insole I prefer to employ as the repellent material a natural aqueous dispersion of rubber, such as latex, although I may employ an artificially produced water-dispersed rubber cement or a cement consisting of a solution of rubber in an organic solvent, such as benzol or naphtha. If the upper is to be lasted with pyroxylin cement it may be found desirable to roughen the margin of the insole in any suitable manner, for example, by means of a wire brush (such roughing being indicated at 16 in Figs. 1 and 2) to prepare the sole margin to receive the lasting cement in such a manner as to insure a suitable bond or union between the upper and the insole. If the insole is to be roughened as above described it is preferable to roughen it before applying the stripe of repellent material so that the latter will adhere more effectively to the insole. If a filler in sheet form is to be employed to fill the space between the insole and the outsole of the shoe, inside of the overlasted upper margins, it may be found desirable to apply a coating of latex or pyroxylin cement to the surface of the insole inside the stripe of repellent material, as indicated at 18 in Fig. 5, this coating serving to attach the sheet filler to the insole. In cases where pyroxylin cement is employed it is preferable to apply it to a quantity of insoles upon which it is allowed to dry, the cement being activated by the application of a suitable solvent thereto just prior to the lasting of the upper thereover.

As a convenient method of applying the stripe of repellent material the insole may be fed through a liquid-applying or so-called extruding machine of the type shown, for example, in the application of J. W. Johnson, Serial No. 692,043, filed October 3, 1933. As shown in Fig. 1, such a machine comprises upper feed members 20, lower feed members 22, an edge gage 24, and a nozzle 26 through which the repellent material is extruded, the nozzle 26 being shaped to apply a stripe of material of the required width. In a machine of this type the repellent material will be applied progressively along the sole margin as the latter is fed past the edge gage 24 and beneath the nozzle 26. If paraffin or other wax is to be employed as the repellent material the nozzle 26 may be heated in any suitable manner to insure the application of the material in free flowing liquid form. The edge gage 24 may be made adjustable toward and from the nozzle 26 and advantageously means (not shown) may be provided whereby the operator is enabled to vary the adjustment of the edge gage while the work is being fed through the machine so as to cause the spacing of the stripe of repellent material from the sole edge to be varied at will. In this way the edge gage may be adjusted to cause the repellent material to be spaced somewhat farther inwardly from the sole edge in the forepart than in the shank portion of the insole, thereby allowing for a wider area of attachment between the upper and the insole in the forepart, where the sole is to be comparatively flexible in the finished shoe than in the shank where it is to be comparatively rigid.

When pyroxylin cement is to be applied to the margin of the insole for use in securing the upper to the insole, it may be applied in the stock fitting room before the insole is assembled upon a last by means of an extruding machine similar to the machine already described as being employed for applying the repellent material.

After an insole has been prepared by having a stripe of repellent material applied thereto and by having a stripe of cement applied outside the stripe of repellent material, the insole is tacked to the bottom of a last and the upper materials 30 (herein shown as comprising an upper and a lining) are assembled therewith. Thereafter cement is applied to the marginal portions of the upper materials, i. e., to the side of the lining which is to face the insole and also between the lining and the upper, and the upper and lining are worked into lasted relation to the insole and last in the customary manner.

The operation of lasting the toe portion of the upper may advantageously be performed by means of a bed lasting machine of a well-known type such, for example, as the machine disclosed in United States Letters Patent No. 1,018,477, granted February 27, 1912, upon application of Matthias Brock. In the use of a bed lasting machine of this type the toe wipers (one of which is indicated at 32 in Fig. 6) are first moved inwardly to engage their edge portions with the upper at opposite sides of the toe of the last in locations below the bottom of the last and while being pressed inwardly against the sides of the last the wipers are raised to wipe the upper materials upwardly so as to tighten them against the last. When the wipers have been raised sufficiently above the insole they are moved toward each other to wipe the margins of the upper materials inwardly over the edge of the insole, thus to press them firmly against the margin of the insole so that the cement upon the insole or upon the upper materials will cause the latter to adhere to the insole. The lasting of the upper over the insole at the opposite sides of the forepart and shank portions of the shoe may be accomplished by means of a side lasting machine in the use of which one or more overlaying members operate progressively along the shoe bottom to wipe the upper materials inwardly over the marginal portion of the insole. During these inward wiping movements of the toe wipers of the bed lasting machine or the overlaying members of the side lasting machine, the stripe of repellent material 12 tends to prevent any inward flow or spread of the attaching cement and if some of the cement is forced inwardly over the surface of the stripe 12 it will not adhere to the latter. As a result the union between the upper materials and the insole will be limited to the area outside of the stripe of repellent material and after the attaching cement has hardened that portion of the upper which extends inwardly beyond this area may be readily raised to facilitate the subsequent operation of trimming the upper materials.

The trimming of the surplus upper materials may be accomplished by any suitable form of upper trimming machine such, for example, as the machine disclosed in United States Letters Patent No. 1,913,421, granted June 13, 1933, upon application of John M. Whelton. Such a machine as illustrated in Fig. 7 comprises a vibratory shear blade 34 and a cooperating rotary shear blade 36. In the use of an upper trimming machine of this type the vibratory blade 34 is introduced between the stripe 12 of repellent material and the overlying portion of the upper margin and the rotary shear blade 36 cooperates with the vibratory blade 34 in trimming the upper, the rotary blade 36 operating also to feed the work to the machine. The vibratory blade 34 acts as a plow to raise the inner portion of the overlasted upper materials as the work is fed and the cutting edge of the member 34 cooperates with the inner boundary of the cemented area between the upper materials and the insole to gage the location of the trimming cut. Inasmuch as this inner boundary of the cemented area has been predetermined by and is coextensive with the outer edge of the stripe of repellent material 12 the trimming cut will be so located that, after the trimming operation has been performed, only the desired width of upper materials will remain. The surplus upper material which is to be trimmed off being entirely free of any adhesion to the insole, because of the interposed stripe 12 of repellent material, it is practicable to present the shoe bottom to the trimming machine at a substantial angle to the horizontal, for example as indicated by dotted lines in Fig. 7, thereby enabling the cutter blades to trim the upper at a corresponding angle to the insole so as to produce a desired beveled edge as a result of the trimming operation.

Having described my invention, what I claim as new and desire to secure by Letters Patent of the United States is:

1. That improvement in the art of making shoes having cement-lasted uppers which consists in applying to a surface of an insole inside a marginal portion thereof to which it is desired to secure an upper a coating of material to which cement will not adhere, and thereafter cement-lasting an upper over the insole while utilizing said material to limit the width of the cement bond between the overlasted upper margin and the insole.

2. That improvement in the art of making shoes the uppers of which are lasted to the insoles with pyroxylin cement which consists in applying a coating of rubber to a surface of an insole inside a marginal portion thereof to which it is desired to secure an upper, and thereafter lasting an upper over the insole with pyroxylin cement while utilizing the coating of rubber to limit the width of the cement bond between the overlasted upper margin and the insole.

3. That improvement in the art of making shoes the uppers of which are lasted to the insoles with rubber cement which consists in applying a coating of wax to a surface of an insole inside a marginal portion thereof to which it is desired to secure an upper, and thereafter lasting an upper over the insole with rubber cement while utilizing the wax to limit the width of the cement bond between the overlasted upper margin and the insole.

4. That improvement in the art of making shoes having cement-lasted uppers which consists in applying to the surface of the insole which is to be attached to the upper of a shoe a stripe of material repellent to the cement which is to be used for the lasting, the stripe extending lengthwise of the sole edge and being spaced inwardly therefrom, and thereafter applying a stripe of lasting cement to said surface of the sole outside of said stripe of repellent material.

5. That improvement in the art of making shoes having cement-lasted uppers which consists in applying to the surface of the insole which is to be attached to the upper of a shoe a stripe of material repellent to cement, the stripe extending lengthwise of the sole edge and being spaced inwardly therefrom, and thereafter coating said surface of the insole with cement both inside and outside of said stripe of repellent material.

6. That improvement in the art of making shoes having cement-lasted uppers which consists in roughing the marginal area of an insole, and applying to the outer portion of the roughened area a stripe of cement and to the inner portion of the roughened area a stripe of material repellent to cement.

7. That improvement in the art of making shoes having cement-lasted uppers which consists in securing to the bottom of a last an insole having a coating of material repellent to cement upon its outer face, said coating being spaced a predetermined distance inwardly from the sole edge, working the upper into lasted relation to the insole and last and cementing the overlasted margin of the upper to the insole outside of said coating, and finally trimming the upper along the outer edge of said coating.

8. That improvement in the art of making shoes having cement-lasted uppers which consists in assembling upon a last an upper and an insole having a marginal stripe of cement on its outer surface and a stripe of material repellent to cement on said surface inside said cement stripe, working the upper into lasted relation to the insole and last and securing the overlasted margin of the upper to the insole, thereby uniting the upper with the insole throughout an area bounded inwardly by the outer edge of said stripe of repellent material, and finally trimming the upper while gaging the location of the trimming cut from the inner edge of said area.

9. A sole having upon its attaching surface a stripe of cement for attaching the sole to a shoe, and a coating of material to which the attaching cement will not adhere, said coating being spaced inwardly from said stripe.

10. An insole having upon the surface to which the upper of a shoe is to be attached a stripe of cement and a stripe of material repellent to said cement, said stripes extending lengthwise about the forepart and along the shank portion of the insole and said stripe of repellent material being located farther from the sole edge in the forepart than in the shank portion of the insole.

11. An insole having upon its surface a stripe of wax adapted to serve as a repellent for rubber cement used in lasting an upper to the insole, said stripe extending lengthwise of the sole and being spaced inwardly from the sole edge sufficiently to provide ample space outside of said stripe for the attachment of the lasting allowance of the upper.

12. An insole having upon the surface which is to be attached to the upper of a shoe a marginal stripe of pyroxylin cement and having a marginal stripe of rubber spaced inwardly from said stripe of cement to serve as a repellent for said cement when the latter is used in lasting an upper to the insole.

13. An insole prepared for use in the manufacture of shoes having cement-lasted uppers by having a marginal stripe of cement upon the surface of the insole which is to be attached to the upper of a shoe and also a coating of material repellent to said cement adjacent to said stripe of cement.

14. An insole prepared for use in the manufacture of shoes having cement-lasted uppers by having upon one surface of the insole a stripe of material repellent to cement, said stripe extending lengthwise of the sole edge and being spaced inwardly therefrom, and by having said surface coated with cement at both sides of said stripe.

15. An insole having upon its outer face a surface coating of material adapted to serve as a repellent for cement used in lasting an upper to the insole, said coating being in the form of a narrow stripe extending lengthwise of the sole edge but spaced inwardly therefrom sufficiently to leave outside of said stripe an uncoated area of a width sufficient to provide for the cement attachment of the lasting allowance of the upper.

JOHN B. HADAWAY.